United States Patent [19]

Ando et al.

[11] Patent Number: 5,467,336

[45] Date of Patent: Nov. 14, 1995

[54] MAGNETO-OPTICAL RECORDING/REPRODUCING APPARATUS WITH OPTICAL PICKUP DEVICE HAVING A MULTI-LAYER DIELECTRIC FILM BEAM SPLITTER

[75] Inventors: Nobuhiko Ando; Kazuhiko Fujiie, both of Tokyo, Japan

[73] Assignee: Sony Corporation, Tokyo, Japan

[21] Appl. No.: 163,927

[22] Filed: Dec. 8, 1993

[30] Foreign Application Priority Data

Dec. 8, 1992 [JP] Japan .................................. 4-327964

[51] Int. Cl.$^6$ .............................. G11B 11/10; G11B 7/00
[52] U.S. Cl. ........................ 369/112; 369/110; 369/116; 369/44.24; 369/44.39; 369/44.17
[58] Field of Search ................................... 369/110, 112, 369/116, 44.17, 44.24, 44.39

[56] References Cited

U.S. PATENT DOCUMENTS

| | | | |
|---|---|---|---|
| 4,973,836 | 11/1990 | Matsuoka | 369/112 |
| 5,073,879 | 12/1991 | Ando et al. | 369/13 |
| 5,151,889 | 9/1992 | Saini et al. | 369/44.37 |

FOREIGN PATENT DOCUMENTS

| | | | |
|---|---|---|---|
| 0141679 | 11/1984 | European Pat. Off. | G11B 11/10 |
| 0313682 | 10/1987 | European Pat. Off. | G11B 11/10 |
| 0439876 | 1/1990 | European Pat. Off. | G11B 7/09 |
| 0537787 | 10/1992 | European Pat. Off. | G11B 11/10 |
| 0601862 | 12/1993 | European Pat. Off. | G11B 7/00 |
| 58-122633 | 7/1983 | Japan . | |

*Primary Examiner*—Viet Q. Nguyen
*Attorney, Agent, or Firm*—Limbach & Limbach; Philip M. Shaw, Jr.

[57] ABSTRACT

An optical pickup device for an information recording and/or reproducing apparatus in which fluctuations in polarization film characteristics due to the variable incident angles of the light beam to the beam splitter may be reduced to prevent C/N characteristics from being lowered. The optical pickup device includes an objective lens 3 for converging a light beam L from a laser light source 1 to a magneto-optical disc 2, a beam splitter 8 arranged on a light path between the laser light source 1 and the objective lens 3 for guiding a return laser light beam Lr from the disc to outside of the light path, and a photodetector 4 for detecting the return light beam Lr guided by the beam splitter 8 to outside of the light path. The beam splitter 8 is arranged at a portion in the light path between the laser light source 1 and the objective lens 3 in which the light beam L from the laser light source 1 is a divergent light beam. The multi-layered dielectric film 12 of the beam splitter 8 has polarization film characteristics of reflecting 65% of S-polarized light components and 35% of the P-polarized light components of the light beam L and the return light beam Lr incident on the multi-layered dielectric film 12.

7 Claims, 9 Drawing Sheets

5,467,336

MAGNETO-OPTICAL RECORDING/REPRODUCING APPARATUS WITH OPTICAL PICKUP DEVICE HAVING A MULTI-LAYER DIELECTRIC FILM BEAM SPLITTER

BACKGROUND

1. Field of the Invention

This invention relates to an optical pickup device for recording information signals on an information signal recording medium, such as a magneto-optical disc. More particularly, it relates to an optical pickup device in which a light beam radiated from a light source is radiated via an objective lens on the information signal recording medium and the return light beam reflected from the recording medium is detected by optical detection means for reading the information signals recorded on the recording medium.

2. Background of the Invention

There has hitherto been proposed an information recording medium for recording information signals by optical means. Typical of the information recording media is a magneto-optical disc. The magneto-optical disc is made up of a disc substrate and a signal recording layer deposited on the disc substrate. The signal recording layer is formed of a material the direction of magnetization of which may be inverted on heating to a temperature not lower than the Curie temperature by radiation of a laser beam and by application of an external magnetic field. For recording and reading information signals on or from the information recording medium, an optical pickup device as explained hereinbelow is employed.

The optical pickup device includes a laser diode device 101 as a light source and an objective lens 102 for converging a light beam L radiated by the laser diode device 101 on the signal recording layer, as shown in FIG. 1. Besides, the optical pickup device includes a photodetector 103 for detecting a return light beam Lr of the light beam L once converged on the signal recording layer.

The laser diode device 101 has a can-shaped package and is driven into laser oscillation by a driving current supplied via plural terminals. The laser diode device 101 has a semiconductor chip arranged in the package and radiates a light beam from the terminal end of an active layer of the semiconductor chip as a result of the laser oscillation. The laser diode device 101 is substantially a point light source. The light beam radiated by the laser diode device 101 is collimated by a collimator lens 104. The collimated light is incident on and transmitted through a beam splitter 105 so as to be incident on the objective lens 102. The objective lens 102 converges the light beam L on a signal recording surface 106a which forms a boundary between the signal recording layer and the disc substrate of the magneto-optical disc 106.

On the signal recording surface 106a, the information signals are substantially concentric in shape and written along a spiral recording track on the recording surface.

The light, beam converged on the signal recording surface 106a is reflect, ed back thereby so as to be re-incident, on the objective lens 102 as a return light, beam Lr. The return light, beam Lr, re-incident, on t, he objective lens 102, is substantially collimated and re-incident, in this state on the beam splitter 105. The major portion of the return light beam re-incident, on the beam splitter 105 is reflect, ed back from a multi-layer dielectric film 107 of the beam splitter 105 so as to be incident, on a three-beam Wollaston prism 108. The multi-layer dielectric film 107 of the beam splitter 105 is so designed as to transmit approximately 80% of a P-polarized component and to reflect approximately 95% of an S-polarized component of the return light beam Lr.

The return light beam Lr incident on the three-beam Wollaston prism 108 is transmitted therethrough and converged by a converging lens 109 on the light receiving surface of the photodetector 103.

The photodetector 103 has plural light receiving surfaces and is arranged within the package. The photodetector 103 is adapted for converting the intensity of the return light beam received by the light receiving surfaces into corresponding electrical signals and for outputting the electrical signals at plural terminals associated with the light receiving surfaces. That is, the electrical signals outputted from the photodetector 103 represent changes in the light volume, in the state of polarization or in the amount of astigmatism of the return light beam.

If the optical pickup device causes information signals to be recorded on the magneto-optical disc 106, the light beam L outgoing from the laser diode device 101 is condensed and radiated on the signal recording layer for locally heating the signal recording layer. At this time, an external magnetic field is applied by a magnetic head device 110 on the signal recording layer. In addition, the state of light convergence of the light beam on the signal recording layer and the position of light beam radiation on the signal recording layer are adjusted at this time based on the various information obtained on the basis of output electrical signals of the photodetector 103.

The information signals recorded on the magneto-optical disc 106 may be read by the optical pickup device based on the information derived from the photodetector 103 while the outgoing light beam from the laser diode device 101 is converged and radiated on the signal recording layer.

The multi-layer dielectric film 107 of the beam splitter 105 of the conventional optical pickup device described above has a polarization film characteristic of causing substantially 100% of the S-polarized component of the return light beam from the magneto-optical disc 106 to be incident on the photodetector 103. However, such polarization film characteristic presents a problem that it is significantly changed depending on the angle of incidence of the light beam L on the beam splitter 105.

That is, if the beam splitter 105 is arranged in a converging light beam or in a divergent light beam, double refraction is likely to be incurred in the multi-layer dielectric film 107 of the beam splitter 105. If double refraction is incurred in the multi-layer dielectric film 107, the carrier to noise (C/N) ratio is lowered so that information signals cannot be read satisfactorily from the magneto-optical disc 106. Such double refraction is ascribable to the incident angle dependency of transmittance to the incident light beam of the multi-layer dielectric film 107 of the beam splitter 105 and is incurred in particular due to the phase deviation between the P-polarized component and the S-polarized component produced by the multi-layer dielectric film 107 insofar as the convergent and divergent light beams are concerned.

Consequently, it has been customary with the conventional optical pickup device to arrange the beam splitter 105 in a portion on the light path between the laser diode device 101 and the objective lens 102 in which the light beam remains a collimated light beam, and to arrange the three-beam Wollaston prism 108 so that the collimated light reflected by the multi-layer dielectric film 107 of the beam splitter 105 is incident thereon. That is, with the above-described conventional optical pickup, it becomes necessary to provide the collimator lens 104 upstream of the beam splitter 105 for collimating the divergent light beam, and the converging lens 109 for converging the collimated light transmitted through the three-beam Wollaston prism 108 to the photodetector 103. The result is an increased number of the component parts and an increased length of the optical path, thus leading to increased production costs and hindrance to the reduction in size and simplification of the optical pickup device.

For reducing fluctuations in polarization film characteristic due to the variable incident angle of the light beam L on the beam splitter 106, there is proposed a method for adjusting the polarization film characteristic of the multi-layer dielectric film of the beam splitter 105 so that the reflectance of the P-polarized component Rp is equated to the reflectance of the S-polarized component Rs (Rp=Rs). However, this raises a further problem that the effect of the beam splitter 105 on increasing the angle of rotation of the plane of polarization, known as an enhancement effect, cannot be expected, such that the C/N characteristic of the photomagnetic signals is lowered.

The above-mentioned enhancement effect is the effect that the angle of rotation $\phi$ of the plane of polarization caused by the magneto-optical disc 106 becomes larger by a factor of $\alpha$ after reflection. The factor $\alpha$ may be given by an equation 1

$$\alpha = \frac{1}{\phi} \tan^{-1}\left( \frac{\sqrt{Rs} \cdot \sin\phi}{\sqrt{Rp} \cdot \cos\phi} \right) \quad (1)$$

The larger the amounts of changes in the angle of rotation $\phi$ of the plane of polarization of the incident light and an angle of rotation $\alpha\phi$ of the plane of polarization of the reflected light, the higher becomes the detection characteristic of the S-polarized component and the P-polarized component on the photodetector 103 to improve the C/N characteristic of the photomagnetic signals.

However, since the relation Rp=Rs needs to be met in the above-described proposed optical pickup device, the value of $\alpha$ is diminished, as a result of which the C/N characteristic of the photomagnetic signals are deteriorated.

OBJECTS AND SUMMARY OF THE INVENTION

In view of the above-depicted status of the art, it is an object of the present invention to provide an optical pickup device in which fluctuations in the polarization film characteristic with variable incident angles of the light beam on the beam splitter may be diminished and the C/N characteristic may be prevented from being lowered.

It is another object of the present invention to provide an optical pickup device in which the number of optical components and the length of the optical path may be reduced and in which production costs may be lowered.

It is a further object of the present invention to provide an optical pickup device in which incident angle dependency of the polarization film characteristic of the multi-layer dielectric film of the beam splitter may be reduced and a sufficient optical path length from the beam splitter to the photodetector may be maintained while the optical pickup device and hence the recording/playback apparatus having the optical pickup device built therein may be reduced in size, with the focusing error detection sensitivity remaining at a higher level.

According to the present invention, there is provided an optical pickup device comprising a light source for radiating a divergent light beam, an objective lens on which the light beam radiated by the light source is incident for converging the incident light beam on an information signal recording medium, a beam splitter arranged on a first light path between the light source and the objective lens for guiding a reflected light beam containing a polarized light component modulated by the information signal recording medium to a second light path outside of the first light path, and photodetector means for detecting the reflected light beam guided by the beam splitter to the second light path, wherein the beam splitter has a multi-layer dielectric film formed by a plurality of dielectric films stacked together and is arranged in a portion on the first light path in which the light beam is a the divergent light beam, the multi-layer dielectric film having polarization film characteristics of reflecting 60 to 80% of the modulated polarized components of the light beam incident on the multi-layer dielectric film and 20 to 40% of components of the incident light beam orthogonal to said modulated polarized components.

According to the present invention, there is also provided an optical pickup device comprising a light source for radiating a divergent light beam, an objective lens on which the light beam radiated by the light source is incident for converging the incident light beam on an information signal recording medium, a beam splitter arranged on a first light path between the light source and the objective lens for guiding a reflected light beam containing a polarized light component modulated by the information signal recording medium to a second light path outside of the first light path, and photodetector means for detecting the reflected light beam guided by the beam splitter to the second light path, wherein the beam splitter is arranged in a portion on the first light path in which the light beam is a the divergent light beam, so that the optical axis of the light beam incident on the multi-layer dielectric film of the beam splitter makes an angle larger than 45° with a line normal to the surface of the multi-layer dielectric film, the light incident surface of the beam splitter makes a right angle with the optical axis of the light beam and wherein the light outgoing surface of the beam splitter makes a right angle with the optical axis of the reflected light beam.

The multi-layer dielectric film 12 of the multi-layer dielectric film 12 has polarization film characteristics of reflecting 60 to 80% of the modulated polarized components of the light beams (L, Lr) incident on the multi-layer dielectric film and 20 to 40% of orthogonal components of the incident light beams (L, Lr).

An optical device 11 may be arranged on a light path between the beam splitter and the photodetector means for causing changes in a spot shape with movement of a light spot in the in-plane direction of the information recording medium. A light beam splitting optical device exhibiting polarized light dependency is arranged in a portion on a second light path between the beam splitter and the photodetector means in which the reflected light beam is a converging light beam.

An optical device 10 for converting the divergent light beam from the light source into a collimated light beam may be arranged on a second light path between the beam splitter and the objective lens.

With the optical pickup device according to the present invention, if it is assumed that the light beam L radiated from the light source 1 is incident as the P-polarized light on the beam splitter 8, 60 to 80% of the polarized light component of the light beam L from the light source 1 is transmitted through the multi-layer dielectric film 12 of the beam splitter 8 to fall on the objective lens 3. The light beam L incident on the object lens 3 is converged by the objective lens 3 on the information recording medium 2.

The light beam L converged on the information recording medium 2 is modulated depending on the information recorded on the information recording medium 2. Consequently, modulated polarized components corresponding to the information are contained in the reflected light beam Lr from the information recording medium 2. The reflected light beam Lr containing the modulated polarized components is re-incident on the beam splitter 8.

The multi-layer dielectric film 12 of the beam splitter 8 is of polarization film characteristics of reflecting 60 to 80% of the modulated polarized components of the light beams (L, Lr) incident on the multi-layer dielectric film and 20 to 40% of orthogonal components of the incident light beams (L, Lr). Therefore, if the information recording medium 2 is a magneto-optical recording medium, the angle of rotation of the return light beam Lr becomes larger than the Kerr rotation angle φ by the recording medium 2, due to the enhancement effect, that is, the Kerr rotation angle is apparently increased.

Besides, as compared to the conventional system in which substantially 100% of the modulated polarized light components of the reflected light beam Lr from the information signal recording medium 2 are reflected, the polarization film characteristics are not significantly changed depending on the angle of incidence of the light beams L, Lr on the beam splitter 8 to enable the phase difference between the modulated polarized light components and orthogonal components to be diminished.

Consequently, it becomes possible to prevent the reflected light beam Lr incident on the beam splitter 8 from becoming elliptically polarized during reflection or transmission to prevent the signal intensity (C/N) from being lowered due to elliptical polarization.

Thus, with the above described optical pickup device, the polarization film characteristics of the multi-layer dielectric film 12 of the beam splitter 8 are not significantly changed depending on the angle of incidence of the light beam L from the light source 1 and the return light beam Lr from the information recording medium 2 to prevent occurrence of adverse effects on the servo system and on the signal reproducing system. That is, the polarization film characteristics of the multi-layer dielectric film 12 are not changed significantly even if the reflected light beam Lr re-incident on the beam splitter 8 is a convergent light beam.

As a result thereof, the beam splitter 8 may be arranged in such a portion in the optical path between the laser light source 1 and the object lens 3 in which the light beam L from the laser light source 1 is a divergent light beam. Besides, there is no necessity of providing the converging lens for converging the return light beam Lr on the photodetector 4. Consequently, the number of optical components and the length of the optical path may be correspondingly reduced to reduce the size of the optical pickup device and production costs.

With the optical pickup device according to the present second embodiment, since the angle θ between the optical axis of the light beams incident on the multi-layer dielectric film 12 of the beam splitter 8 and the line m normal to the multi-layer dielectric film 12 is selected to be larger than 45°, the return light Lr reflected by the magneto-optical disc 2 to fail on the beam splitter 8 is reflected by the multi-layer dielectric film 12 so that its optical axis makes an angle less than 90° (an acute angle) with respect to the optical axis of the light beam L radiated from the laser light source 1. That is, the return light beam Lr split and reflected by the beam splitter 8 proceeds in a direction at an acute angle relative to the optical axis of the light beam L from the laser light source 1.

Thus the perpendicular distance of the photodetector 4 to the optical axis of the light beam L from the laser light source 1 may be decreased as a function of the angle θ between the optical axis of the light beam L incident on the multi-layer dielectric film 12 of the beam splitter 8 or the return light beam Lr and the line m normal to the multi-layer dielectric film 12 for correspondingly decreasing the amount of protrusion of the return light path from the beam splitter 8 to the photodetector 4 relative to the forward light path from the laser light source 1 up to the beam splitter 8.

On the other hand, the return light path from the beam splitter 8 up to the photodetector 4 is protruded with an obtuse angle relative to the forward light path from the beam splitter 8 to the object lens 3 to conserve a larger space delimited by the forward and return light paths. Consequently, an electric motor having a larger driving capacity may be employed as driving means for rotationally driving the magneto-optical disc 2 for assuring stabilized rotation of the magneto-optical disc 2. Besides, the return light path from the beam splitter 8 up to the photodetector 4 does not collide with the spindle motor 42 rotationally driving the magneto-optical disc 2, so that not only the space factor may be improved but also a larger length n may be assured for the radial distance of the information.

DETAILED DESCRIPTION OF THE INVENTION

Referring to FIGS. 3 to 8, two preferred embodiments of the optical pickup device of the present invention, adapted for use with a magneto-optical disc, are explained in detail.

Figure 1:
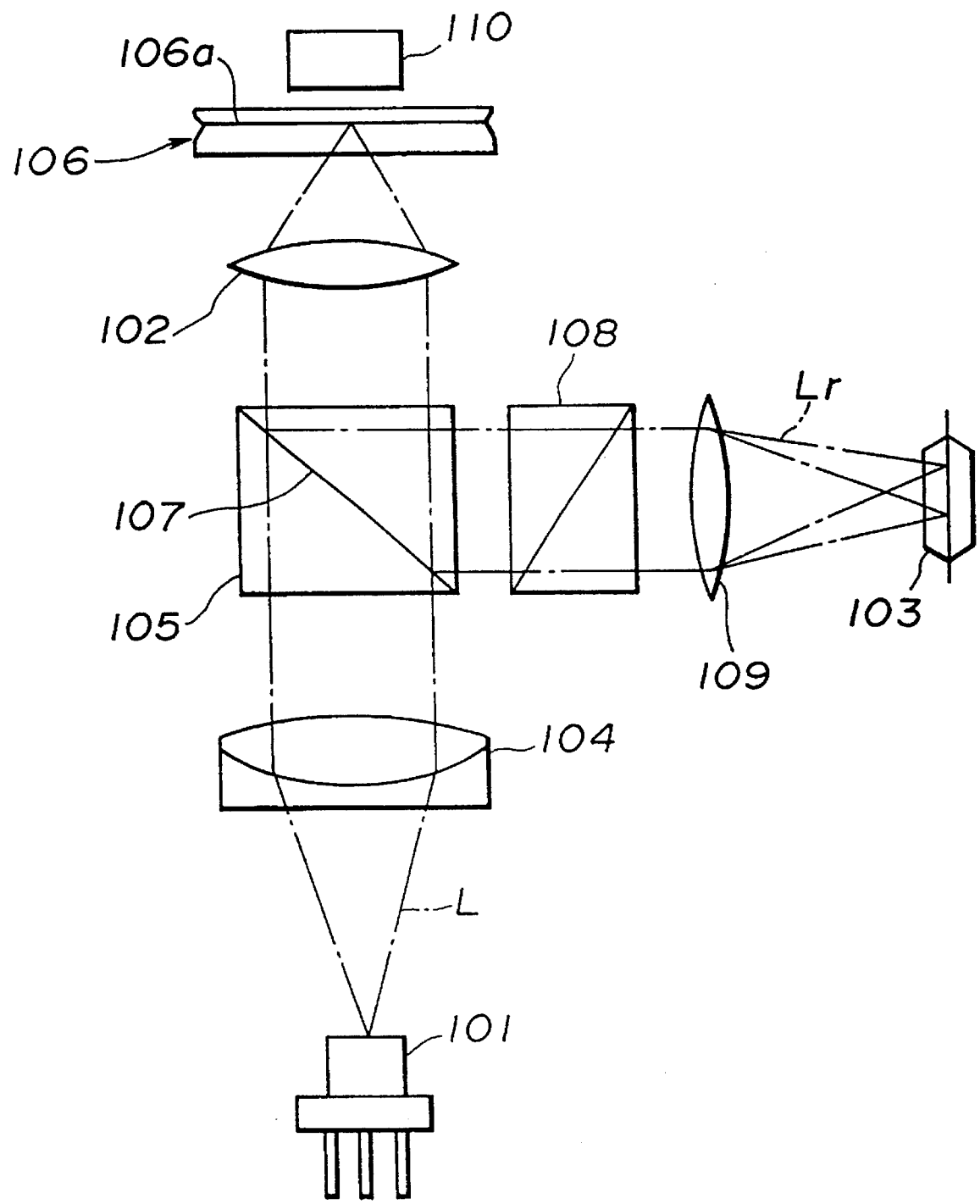
FIG. 1 illustrates a schematic arrangement of an optical system of a conventional oral optical pickup device.
Figure 2:
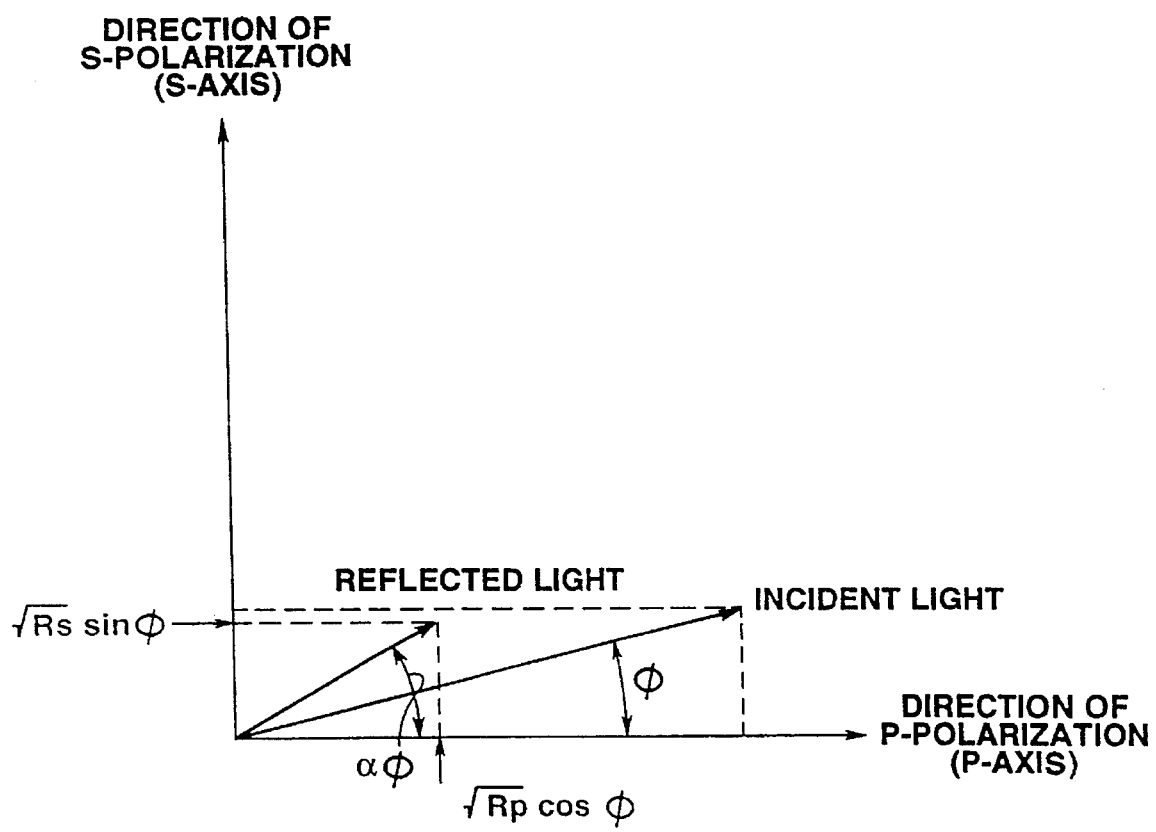
FIG. 2 is a graph showing an enhancement effect of the angle of rotation of the polarization plane (Kerr rotation angle) by the beam splitter.
Figure 3:
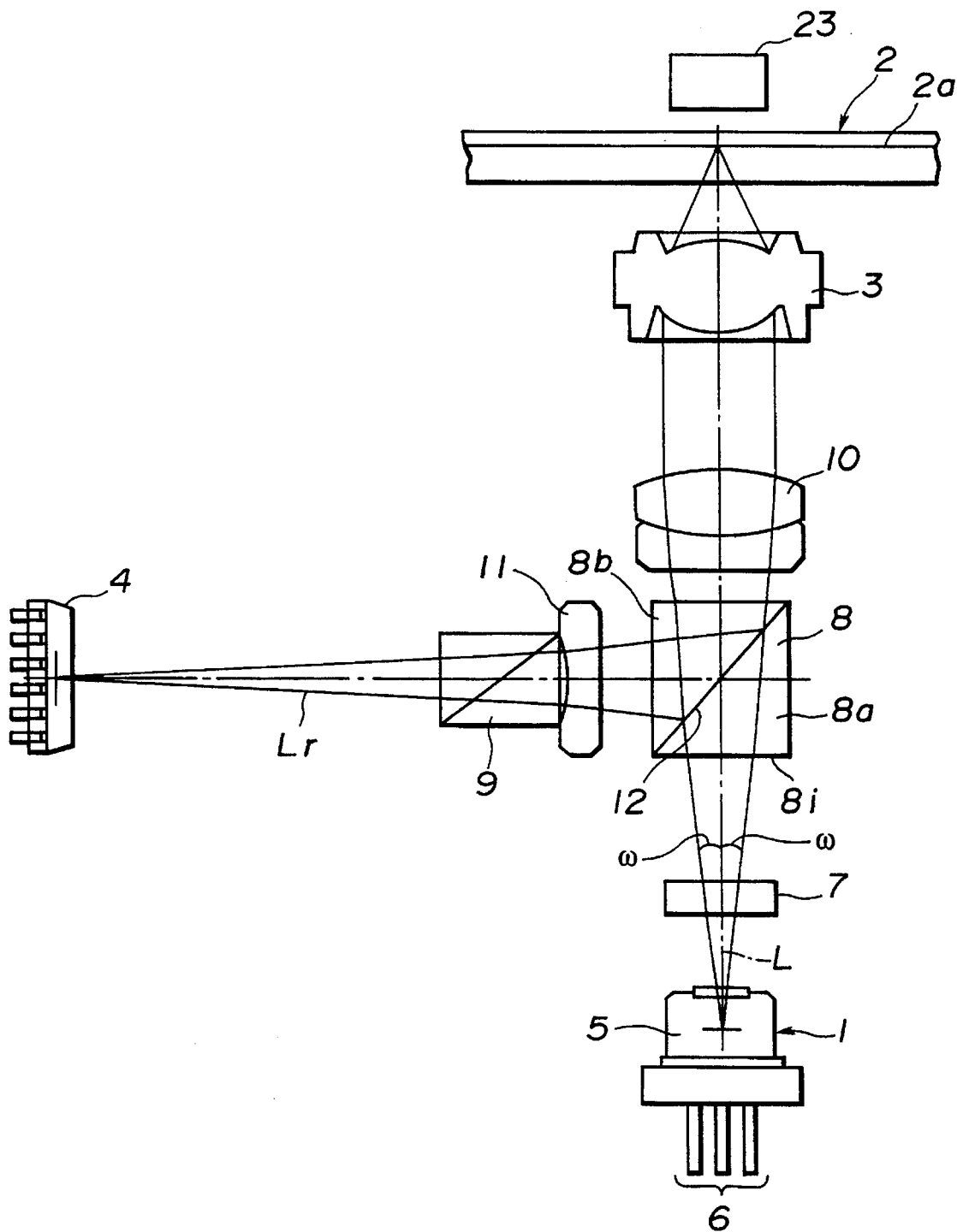
FIG. 3 illustrates a schematic arrangement of an optical pickup device for a magneto-optical disc according to a first embodiment of the present invention.

The optical pickup device of the first embodiment includes an optical system made up of a laser light source 1 formed by a semiconductor laser as a light source of the light beam L, an infinite-system objective lens 3 for converging the light beam L on the magneto-optical disc 2 and a photodetector 4 for detecting the return light beam Lr reflected back from the magneto-optical disc 2 for converting the light beam into an electrical detection signal having a current or voltage level corresponding to the detected light volume, as shown in FIG. 3. The optical system in its entirety is arranged as a unit which may be moved by known displacement means, such as a linear motor, along the radius of the magneto-optical disc 2.

The laser light source 1 is arranged in a can-shaped package 5 and is driven into laser oscillation by a driving current supplied via plural terminals. The laser light source 1 is arranged as a semiconductor chip having an activated layer. The light beam is radiated from a terminal end of the activated layer. The laser light source 1 is substantially a point light source.

The optical system includes, besides the above-mentioned optical components, a phase diffraction lattice 7 for splitting the light beam L into at least three light beam components, a beam splitter 8 for separating the light beam L from the laser light source 1 from the return light beam Lr from the magneto-optical disc 2, and a three-beam Wollaston prism 9 arranged between the beam splitter 8 and the photodetector 4 for further separating the return beam Lr into three light beam components.

A collimator lens 10 for collimating the light beam L from the laser light source 1 is arranged between the beam splitter and the objective lens 3. On the other hand, a multiple lens 11 made up of a cylindrical lens and a concave lens for adjusting the focal length of the return light beam Lr and producing astigmatism is arranged between the beam splitter 8 and the three-beam Wollaston prism 9.

With the optical pickup device of the present first embodiment, the beam splitter 8 is placed at a portion of a light path of the light beam L outgoing from the laser light source 1 in which the light beam L is in the state of a divergent light beam. The beam splitter 8 has the shape of a cuboid consisting of two rectangular prisms 8a and 8b bonded to each other at respective oblique surfaces and a multi-layer dielectric film 12 is applied on the bonded oblique surfaces.

The multi-layer dielectric film 12 is formed by several layers of high refractive index dielectric films and low refractive index dielectric films stacked together on the oblique surface of one of the prisms, such as the prism 8a, such as by vacuum deposition. The high refractive index dielectric film and low refractive index dielectric film may for example be formed of $TiO_2$ and $SiO_2$ or $MgF_2$, respectively.

With the present embodiment, the film thickness, refractive index and the number of layers of the multi-layer dielectric film 12 are selected for realizing optical characteristics in which 60 to 80%, herein 65%, of the S-polarized components, of the light beam L and the return light beam Lr incident on the multi-layer dielectric film 12 and 20 to 40%, herein 35%, of the P-polarized components of the light beam L and the return light beam Lr are reflected. In terms of light transmittance, the optical characteristics are such that 20 to 40%, herein 35%, of the S-polarized components, and 60 to 80%, herein 65%, of the P-polarized components, are transmitted, if loss components are disregarded.

If the above optical characteristics are to be achieved by proper selection of the film thickness of the multi-layer dielectric film 12, it is necessary for the optical thickness to be equal to $\lambda/4$, where $\lambda$ is the wavelength of the light beam L, for possibly avoiding the occurrence of a phase difference between the P-polarized components and the S-polarized components.

The operation of the optical pickup device is hereinafter explained. The outgoing light beam L from the laser light source 1 is incident on the phase diffraction lattice 7 by which it is split into at least three light beam components, namely a 0th order light, a +1st order light and a −1st order light. The light beam thus split is incident on the beam splitter 8. Since the respective components of the light beam L, incident on the beam splitter 8, are the P-polarized light relative to the multi-layer dielectric film 12 of the beam splitter 8, approximately 65% of the incident light beam is transmitted through the multi-layer dielectric film 12 to fall on the collimator lens 10.

The respective components of the light beam L, incident on the collimator lens 10, are collimated thereby so as to be incident on the objective lens 3. The objective lens converges the respective components of the incident light beam L on the signal recording layer 2a which is a boundary surface between the disc substrate and the signal recording layer of the magneto-optical disc 2.

On the signal recording surface 2a, the information signals are substantially concentric in shape and written along a spiral recording track on the recording surface. The respective components of the light beam L, produced by splitting by the phase diffraction lattice 7, are radiated on the signal recording surface 2a so as to straddle the recording track. That is, of the three components of the light beam L, a center light component (0th order light) radiates the center of the recording track on the magneto-optical disc 2, while the remaining two light components (±1st order light components) are radiated an associated guide groove.

By the above-described arrangement, the tracking error detection system, known as the three-beam system, is performed. That is, the relative shift in the positions of the recording track and the radiating position of the center main beam may be detected by comparing the amounts of the light of both side light beams as reflected by the edges of the guide groove associated with the recording track.

The light component of the light beam L radiated on the center of the recording track is modulated depending on pre-pits formed along the recording track, while having its plane of polarization rotated in accordance with the pattern of magnetization of the signal recording layer on the recording track. That is, the light beam converged on the signal recording surface 2a has its plane of polarization rotated from the P-axis by an angle equal to the Kerr rotation angle φ corresponding to the information of the magnetization recorded thereon, so that the light beam now has the content of the S-polarization component. Meanwhile, the sub-beam radiated on the guide groove is modulated depending on the edge of the guide groove.

The light beam L converged on the signal recording surface 2a is reflected thereby so as to be incident again on the objective lens 3 as the return light beam Lr having the content of the S-polarized component. The return light beam Lr, re-incident on the objective lens 3, is substantially collimated to fall on the collimator lens 10. The return light beam Lr, re-incident on the collimator lens 10, is turned into a converged light which is re-incident on the beam splitter 8.

Since the polarization film characteristic of the multilayer dielectric film 12 is such as to reflect 65% of the S-polarized light component and 35% of the P-polarized light component of the return light beam incident on the multi-layer dielectric film 12 (the reflectance of the S-polarized light component Rs=65% and the reflectance of the P-polarized light component Rp=35%), the converged return light beam Lr, re-incident on the beam splitter 8, has its angle of rotation increased by a factor of a as compared to the Kerr rotation angle by the information recording medium, by the above-mentioned enhancement effect, as indicated by the following equation (2)

$$\alpha = \frac{1}{\phi} \tan^{-1}\left( \frac{\sqrt{Rs} \cdot \sin\phi}{\sqrt{Rp} \cdot \cos\phi} \right) \quad (2)$$

so that the apparent Kerr angle of rotation is apparently increased.

Besides, as compared to the conventional system in which the polarization film characteristic is such as to reflect substantially 100% of the S-polarized light component of the return light beam Lr from the magneto-optical disc 2, the polarization film characteristic is not drastically changed depending on the incident angle of the light beam L on the beam splitter 8, so that the phase difference between the P-polarized light component and the S-polarized light component may be diminished. With the above-described first embodiment, it is possible to suppress the changes in the transmittance and reflectance of both side light beam components of the light beam L radiated from the laser light source 1 and incident on the incident surface 8i of the beam splitter 8 so as to be less than about ±5% for the angle between the optical axis and the multi-layer dielectric film 12 of 45° and the angle of divergence ω within a range of ±5%.

Since the multi-layer dielectric film 12 of the beam splitter 8 of the present embodiment exhibits low incident angle dependency of the light reflectance and transmittance, there is no risk of double refraction in the return light beam Lr even although the return light beam Lr incident on the beam splitter 8 is the converging light. That is, the phase difference between the P-polarized light component by the multi-layer dielectric film 12 and the S-polarized light component by the multi-layer dielectric film 12 is not increased despite fluctuations in the incident angle so that the dependency of the light reflectance on the direction of light polarization is lowered. With the present embodiment, the phase difference between the P-polarized component and the S-polarized component may be reduced to not more than 5°.

Consequently, the return light beam Lr incident on the beam splitter 8 after having its plane of polarization rotated by the magneto-optical disc 2 may be prevented from being elliptically polarized during reflection or transmission to prevent the signal intensity (CN ratio) from being lowered due to the elliptical polarization.

The return light beam Lr, reflected by the multi-layer dielectric film 12, is led out of the optical path between the laser light source 1 and the objective lens 3 so as to be transmitted through the multiple lens 11 to fall on the three-beam Wollaston prism 9.

The three-beam Wollaston prism 9 is a parallelepipedic prism formed by bonding a pair of triangular prisms each formed in turn by a uniaxial crystal of quartz, futile or calcite, as disclosed in detail in JP Patent KOKOKU Publication No.4-19622 (1992). The directions of the crystal axes of the triangular prisms are orthogonal to the optical axis and interlinked with each other at an angle of approximately 45°.

The return light beam Lr, incident on the three-beam Wollaston prism 9, is incident substantially at right angles to the outer lateral surface of the three-beam Wollaston prism 9 and is obliquely transmitted through the inclined bonding surfaces of the triangular prisms. Thus, when transmitted through the bonding surfaces of the triangular prisms, the return light beam Lr is refracted in different directions, depending on the direction of polarization, for being split into three sub-beams.

That is, the return light beam Lr, falling on and transmitted through the three-beam Wollaston prism 9, is split by the three-beam Wollaston prism 9 into three sub-beams, having different proceeding directions, depending on the difference in the directions of polarization. In the present embodiment, each of three beam components of the return light beam Lr, split by the phase diffraction lattice 7, is split into three sub-beams in the directions of intersecting the splitting directions by the phase diffraction lattice 7. In this manner, a sum total of nine sub-breams of the return light beam Lr are outputted from the three-beam Wollaston prism 9.

The nine sub-beams of the return light beam Lr from the three-beam Wollaston prism 9 are incident on the photodetector 4 with a substantially square-shaped beam spot array on the photodetector 4.

Figure 4:
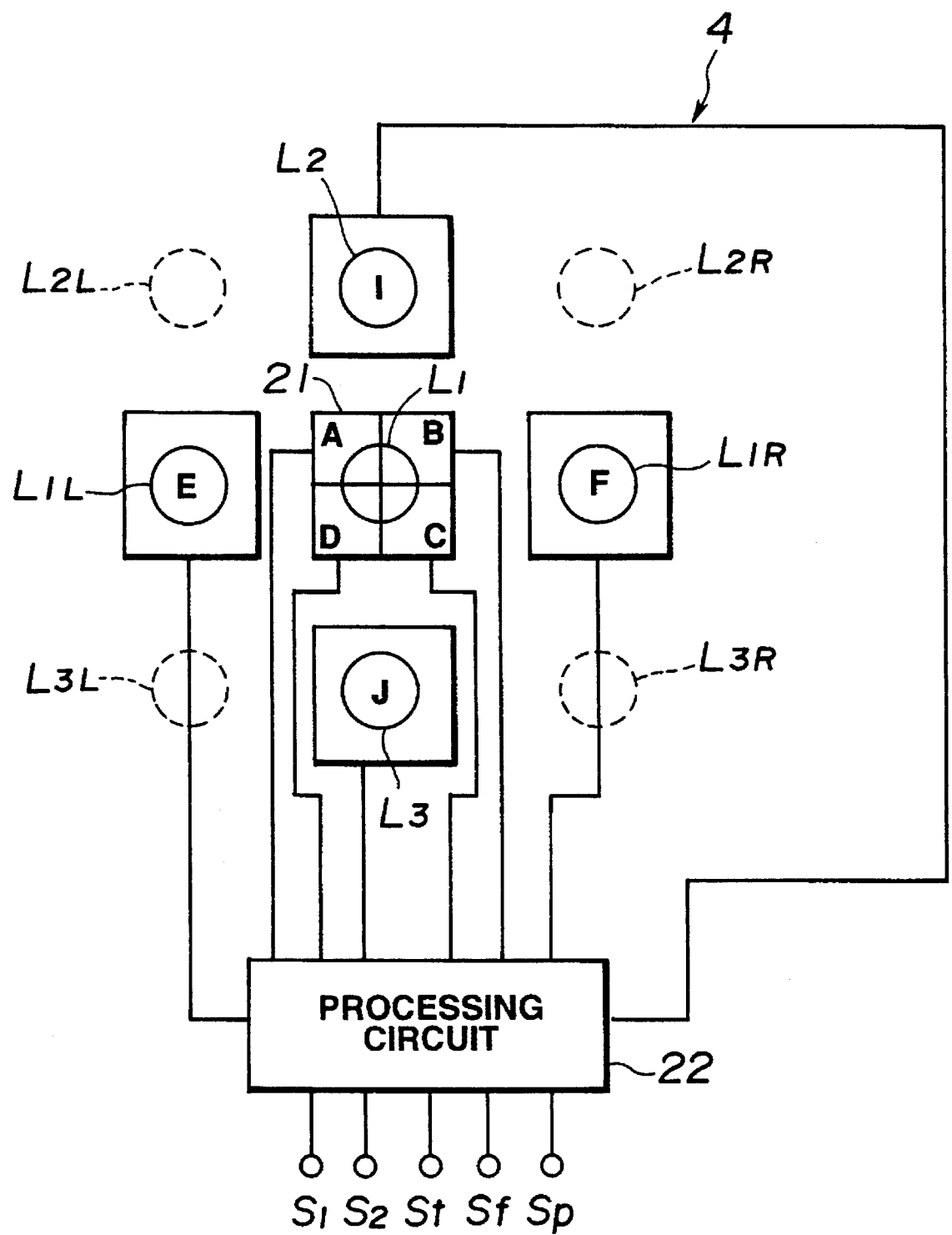
FIG. 4 is a schematic plan view showing an arrangement of a photodetector employed in the optical pickup device shown in FIG. 3.

An illustrative construction of the photodetector 4 is explained by referring to FIG. 4. The photodetector 4 has a plurality of light-receiving regions each consisting in a pn junction. Specifically, the photodetector 4 includes a four-segment detector 21 made up of four light receiving elements A, B, C and D in a square-shaped array, each elements A to D being of a small light-receiving area. Square-shaped first and second light receiving elements I and J are arranged above and below the four-segment detector 21 in the drawing, while square-shaped third and fourth light receiving elements E and F are arranged on the left and right sides of the four-segment detector 21 in the drawing. The respective light receiving elements are separated from one another by a trenched structure or a field oxide film by selective oxidation (LOCOS).

These light receiving elements are arrayed with respect to the track arraying direction (radial direction) and the tangential direction to the track in such a manner that the central four-segment detector 21 is arranged substantially at a track center, while the first and second light receiving elements I and J are arrayed along the tangent to the track and the third and fourth light receiving elements E and F are arrayed along the track arraying direction.

Of the nine return sub-beams of the return light beam Lr from the optical system, the central return sub-beam L1 is received by the four-segment detector 21. The return sub-beam L2, composed of P-polarized components, and the return sub-beam L3, composed of Q-polarized components, as split by the Wollaston prism 9, are received by the first and second light receiving elements I and J, respectively. Of three return sub-beams L1L, L2L and L3L, disposed on the left side of the centrally disposed return sub-beams L1 to L3, the central sub-beam L2L is received by the third light receiving element E. Of three return sub-beams L1R, L2R and L3R, disposed on the right side of the centrally disposed return sub-beams L1 to L3, the central sub-beam L2R is received by the fourth light receiving element F.

Detection signals from the four-segment detector 21, first and second light receiving elements I and J and the third and fourth light receiving elements E and F are supplied to a processing circuit 22 which performs the arithmetic operations shown by the following equations 3

$$S1 = I + J$$

$$S2 = I - J$$

$$St = E - F \qquad (3)$$

$$Sf = (A+C) - (B+D)$$

$$Sp = (A+D) - (B+C)$$

for generating a pre-pit read signal S1, a playback signal S2 based on the direction of magnetization of the signal recording layer, a tracking error signal St, a focusing error signal Sf and a push-pull signal Sp.

That is, if an object which has incurred light modulation in the return light beam Lr incident on the photodetector 4 is a pre-pit, the signal corresponding to the presence or absence of the pre-pit may directly be used as a read signal, so that an electrical signal having a current level or a voltage level corresponding to the detected light volume of the return light beam Lr may directly be used as the read signal.

Consequently, if the return light beam Lr, modulated by the pre-pit, is incident on the photodetector 4, the sum of the electrical detection signals having output levels corresponding to the volumes of the incident light received by the first and second light receiving elements I and J directly becomes the pre-pit read signal S1.

On the other hand, if an object which has incurred light modulation in the return light beam Lr incident on the photodetector 4 is the signal recording layer, the plane of polarization of the return light beam Lr is rotated by the Kerr effect in different directions depending on the direction of polarization of the signals magnetically recorded on the signal recording layer.

Consequently, the difference between the electrical detection signal having an output level corresponding to the volume of the incident light received by the first light receiving element I irradiated by the P-polarized components of the return light beam Lr and the electrical detection signal having an output level corresponding to the volume of the incident light received by the second light receiving element J irradiated by the S-polarized components of the return light beam Lr directly becomes the playback signal S2 of the signal recording layer.

Since the multiple lens 11 is provided in the present embodiment between the beam splitter 8 and the photodetector 4, the light spot radiated on the light receiving regions of the light receiving elements A to D of the four-segment detector 21 is changed in profile, as the object lens 3 is displaced in a direction at right angles to the plane of the magneto-optical disc 2 so that the focusing error signal Sf may be accurately calculated by the above-mentioned processing by the processing circuit 22.

On the other hand, when recording information signals on the magneto-optical disc 2, the optical pickup device causes the outgoing light beam L from the laser light source 1 to be converged and radiated on the signal recording surface 2a as a boundary surface between the signal recording layer and the disc substrate of the magneto-optical disc 2 for locally heating the signal recording layer. At this time, an external magnetic field is applied to the signal recording layer by a magnetic head device 23 arranged facing the optical pickup device with the magneto-optical disc in-between. In addition, the state of light convergence of the light beam L on the signal recording surface 2 and the point of light beam radiation on the signal recording surface 2 are adjusted at this time based on the various information obtained on the basis of output electrical signals of the photodetector 4, such as the focusing error signal Sf or the tracking error signal St.

With the above-described first embodiment of the optical pickup device according to the present invention, the film thickness, refractive index and the number of layers of the multi-layer dielectric film 12 are selected for realizing polarization film characteristics of the multi-layer dielectric film 12 of the beam splitter 8 in which 60 to 80%, herein 65%, of the S-polarized components of the return light beam Lr incident on the multi-layer dielectric film 12, and 20 to 40%, herein 35%, of the P-polarized components of the return light beam Lr, are reflected, so that there is no risk of the polarization film characteristics of the multi-layer dielectric film 12 of the beam splitter 8 being drastically changed depending on the angle of incidence of the light beam L on the beam splitter 8. In this manner, any adverse effects on the servo and signal reproducing systems may be precluded. That is, even if the reflected light beam re-incident on the beam splitter is the convergent light, there is no risk of the polarization film characteristics of the multi-layer dielectric film 12 being changed significantly.

As a result thereof, the beam splitter 8 may be arranged in such a portion in the optical path between the laser light source 1 and the objective lens 3 in which the light beam L from the laser light source 1 is in the state of a divergent light beam. Besides, there is no necessity of providing the converging lens for converging the return light beam Lr on the photodetector 4. The result is that the number of optical components and the length of the optical path may be correspondingly reduced to reduce the size of the optical pickup device and production costs.

Figure 5:
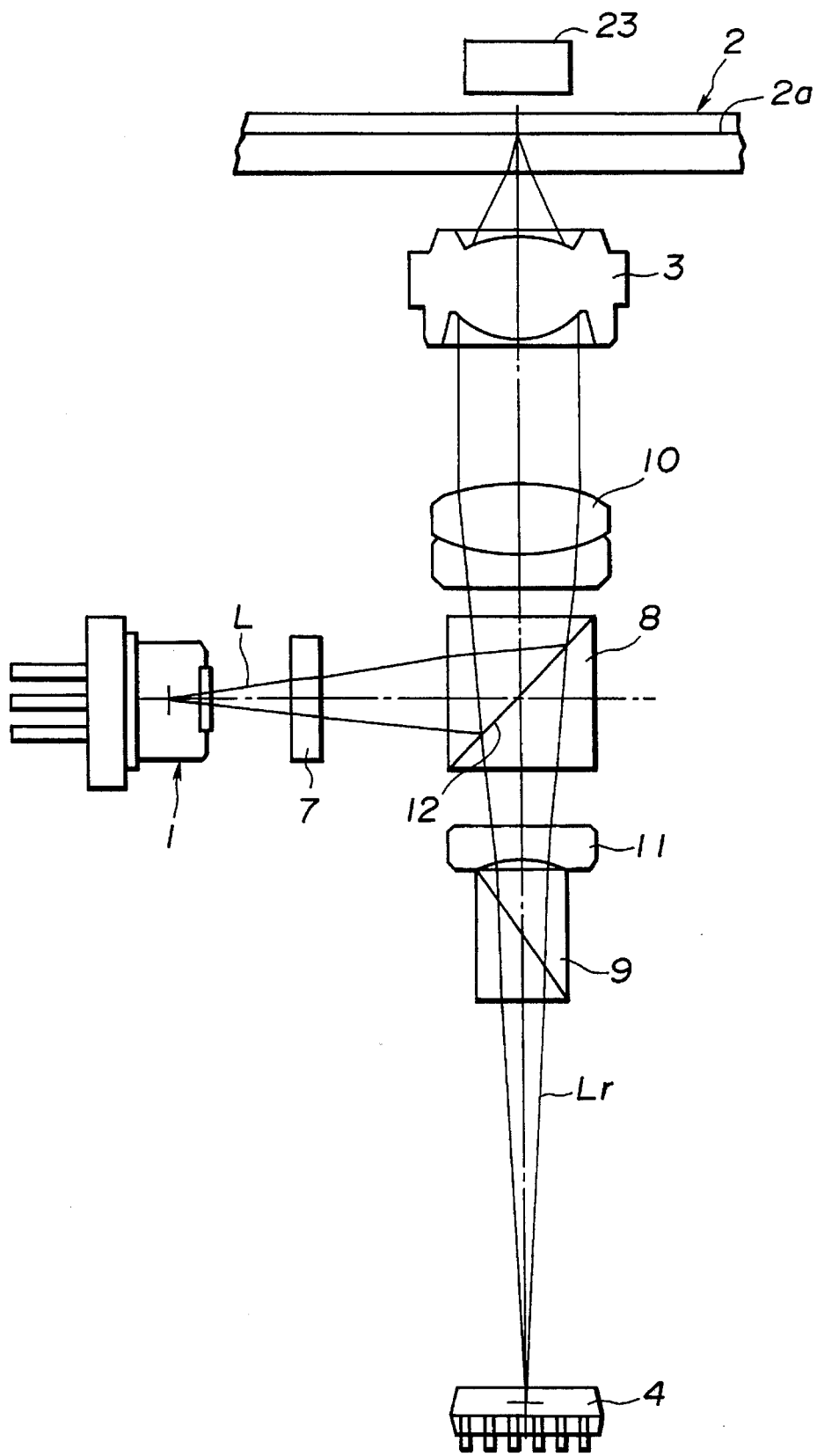
FIG. 5 is a plan view showing a schematic arrangement of a modified embodiment of the optical pickup device according to the present invention.
Figure 6:
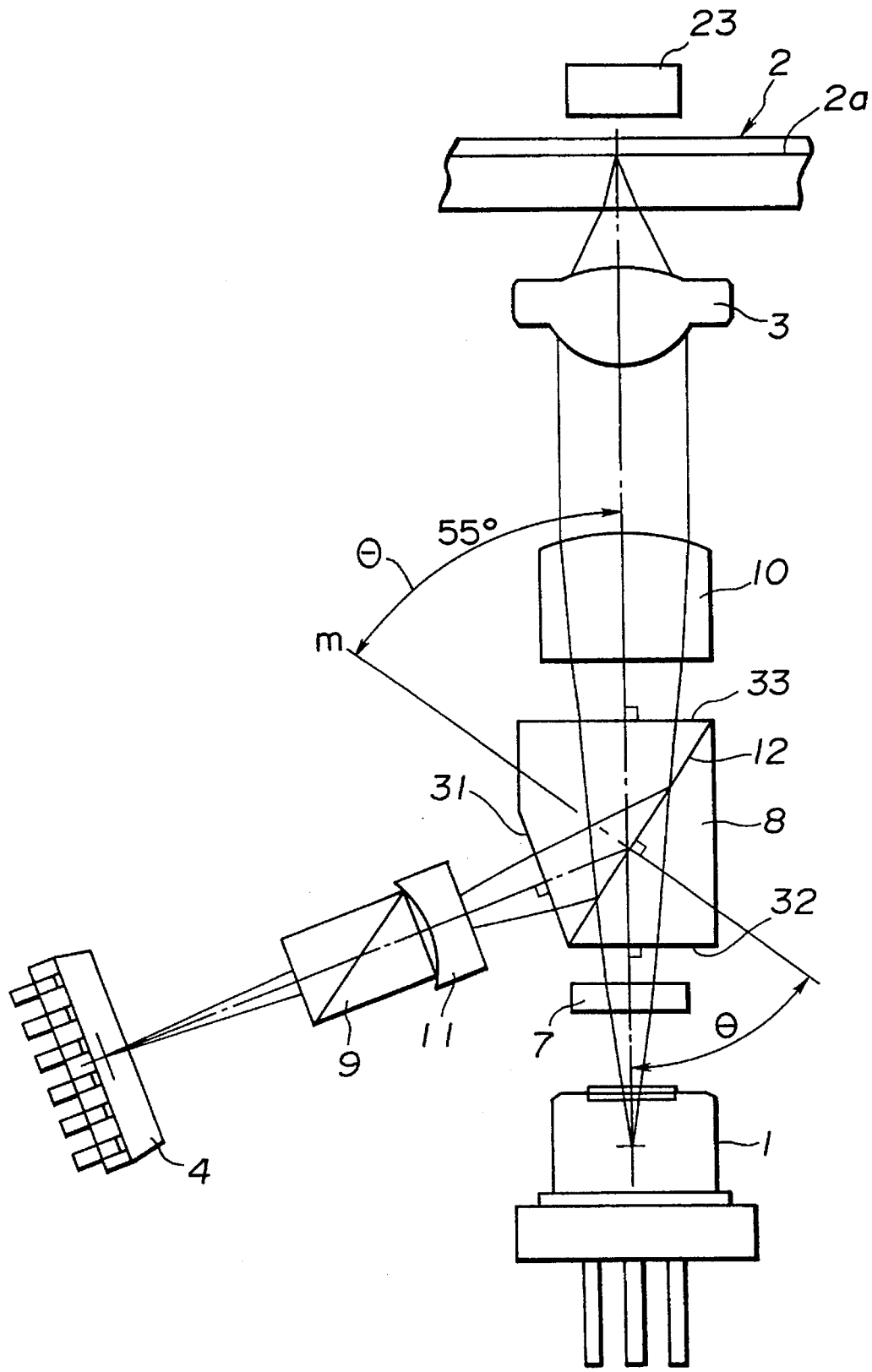
FIG. 6 illustrates a schematic arrangement of an optical pickup device for a magneto-optical disc according to a second embodiment of the present invention.

Several modifications of the optical pickup device according to the above-described first embodiment are explained by referring to FIG. 5, in which the parts or components corresponding to those shown in FIG. 6 are depicted by the same reference numerals.

In distinction from the optical pickup device of the above-described first embodiment, the optical pickup device according to a first modification is so designed that the forward light path of the light beam outgoing from the laser light source 1 is bent 90° by the multi-layer dielectric film 12, while the return light beam Lr from the magneto-optical disc 2 is transmitted through the beam splitter 8, so that the return light path becomes linear, as shown in FIG. 5

The light beam from the laser light source 1 in this case is an S-polarized component, while a P-component is contained in the return light beam Lr due to rotation of the plane of polarization on the signal recording surface 2a. The multi-layer dielectric film 12 has polarization film characteristics in which 60 to 80%, herein 65%, of the P-polarized components, of the light beam L and the return light beam Lr incident on the multi-layer dielectric film 12 and 20 to 40%, herein 35%, of the S-polarized components of the light beams L and Lr are reflected, if losses are disregarded. In terms of light transmittance, the optical characteristics are such that 20 to 40%, herein 35%, of the P-polarized components, and 60 to 80%, herein 65%, of the S-polarized components, are transmitted.

According to second modification, the light beam L from the laser light source 1 is an S-polarized component. In this case, a P-component is contained in the return light beam Lr due to rotation of the plane of polarization on the signal recording surface 2a. The multi-layer dielectric film 12 has polarization film characteristics in which 60 to 80%, herein 65%, of the P-polarized components, of the light beam L and the return light beam Lr incident on the multi-layer dielectric film 12 and 20 to 40%, herein 35%, of the S-polarized components of the light beams L and Lr are reflected. In terms of light transmittance, the optical characteristics are such that 20 to 40%, herein 35%, of the P-polarized components, and 60 to 80%, herein 65%, of the S-polarized components, are transmitted, if losses are disregarded.

According to a third modification, the light, beam L from the laser light source 1 is a P-polarized component. In this case, an S-component is contained in the return light, beam Lr due to rotation of the plane of polarization on the signal recording surface 2a. The multi-layer dielectric film 12 has polarization film characteristics in which 20 to 40%, herein 35%, of the S-polarized components of the light beam L and the return light Lr incident on the multi-layer dielectric film 12 and 20 to 80%, herein 65%, of the P-polarized components of the light beams L and Lr are reflected. In terms of light, transmittance, the optical characteristics are such that 60 to 80%, herein 65%, of the S-polarized components, and 20 to 40%, herein 35%, of the P-polarized components, are transmitted, if losses are disregarded.

In the above-described first the third modifications, similarly to the above-described first embodiments, it becomes possible to diminish fluctuations in the polarization film characteristics due to the incident angle of the light beam L on the beam splitter 8 to prevent the C/N characteristics from being lowered. The result is that the number of optical components and the length of the optical path may be correspondingly reduced to reduce the size of the optical pickup device and production costs.

Figure 7:
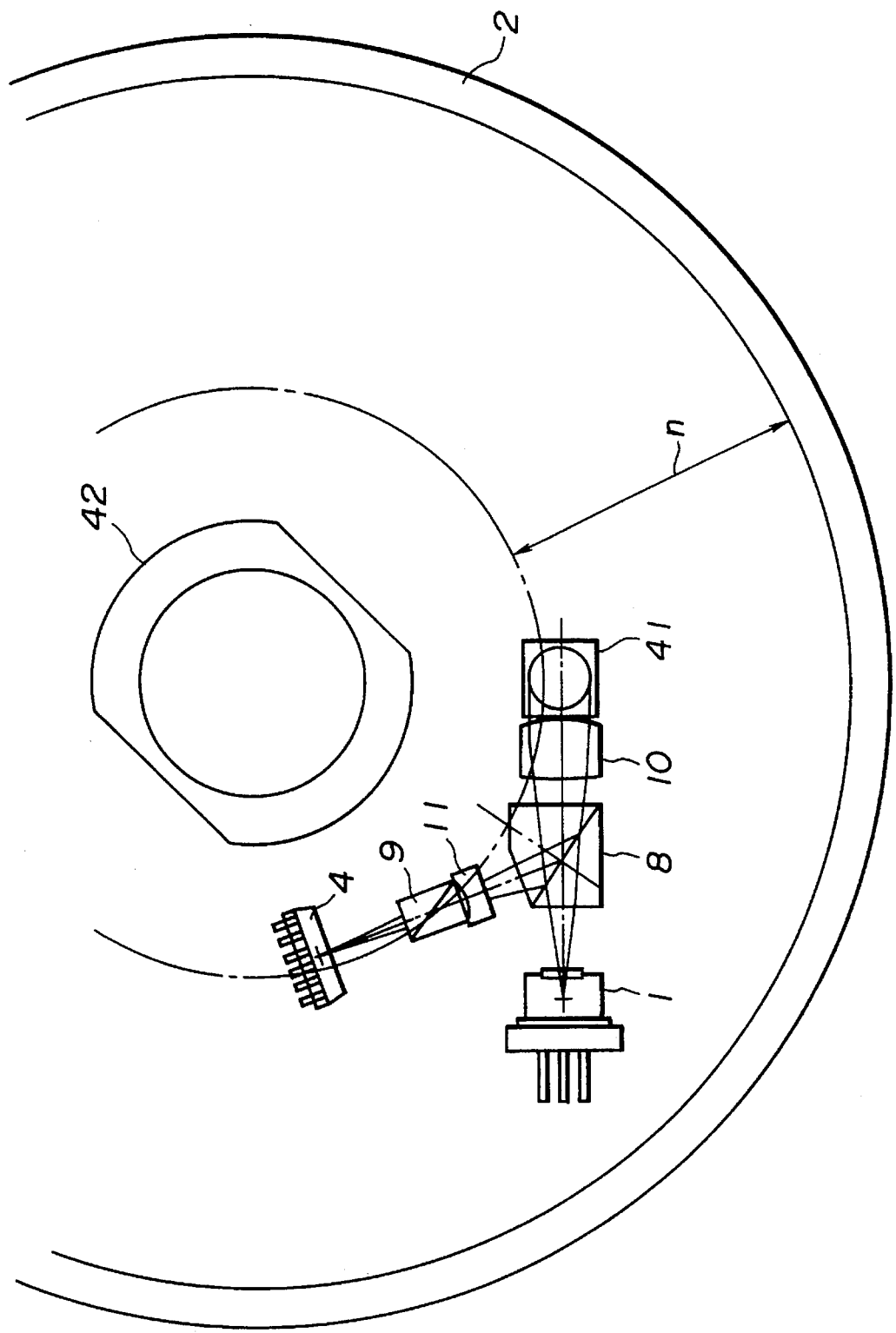
FIG. 7 is a schematic plan view showing the optical pickup device shown in FIG. 6 in position on the magneto-optical disc.

The optical pickup device according to a second embodiment is explained by referring to FIGS. 6 and 7, in which the same numerals are used to depict the parts or components corresponding to those shown in FIG. 3 and redundant description is not made herein for simplicity.

Referring to FIG. 6, the optical pickup device according to the second embodiment is substantially the same as the optical pickup device according to the first embodiment, except that the following arrangement is used for the beam splitter 8.

That is, the beam splitter 8 has the shape of a cuboid having an bias-cut surface 31 and a multi-layer dielectric film 12 is vapor-deposited on an inclined surface defined by a bottom side end face and the opposite side end face of the bias-cut surface 31 as viewed in the drawing. The beam splitter 8 has laser light source side end face 32 as an incident surface of the light beam L from the light source 1, while having its objective lens side end face 33 as an outgoing surface of the light beam L or an incident surface of the return light beam Lr and its bias-cut surface 31 as an outgoing surface of the return light beam Lr.

The angle which the optical axis of the light beam L from the laser light source 1 makes with the incident surface 32 and the outgoing surface 33 is 90°, while the angle which the optical axis of the return light beam Lr makes with the incident surface 32 and the outgoing surface 33 is similarly 90°. With the present embodiment, the optical axis of the light beam L from the laser light source 1 (or the optical axis of the return light beam Lr from the magneto-optical disc 2) makes an angle θ with a line m normal to the multi-layer dielectric film 12 of the beam splitter 8, which angle θ is selected to be larger than 55°, herein 55°.

As in the above-described first embodiment, the multi-layer dielectric film 12 has its polarization film characteristics which are so set as to reflect 60 to 80%, herein 65%, of the S-polarized components, of the light beam L and the return light beam Lr incident on the multi-layer dielectric film 12 and 20 to 40%, herein 35%, of the P-polarized components of the light beam L and the return light beam L.

With the optical pickup device according to the present second embodiment, since the angle θ between the optical axis of the light beam L or the return light beam Lr incident on the multi-layer dielectric film 12 of the beam splitter 8 and the line m normal to the multi-layer dielectric film 12 is selected to be larger than 45°, the return light Lr reflected by the magneto-optical disc 2 to fall on the beam splitter 8 is reflected by the multi-layer dielectric film 12 so that its optical axis makes an angle less than 90° (an acute angle) with respect to the optical axis of the light beam L radiated from the laser light source 1. That is, the return light beam Lr split and reflected by the beam splitter 8 proceeds at an acute angle relative to the optical axis of the light beam L from the laser light source 1.

Thus the perpendicular distance of the photodetector 4 to the optical axis of the light beam L from the laser light source 1 may be decreased as a function of the angle θ between the optical axis of the light beam L incident on the multi-layer dielectric film 12 of the beam splitter 8 and the line m normal to the multi-layer dielectric film 12 for correspondingly decreasing the amount of protrusion of the return light path from the beam splitter 8 to the photodetector 4 relative to the forward light path from the laser light source 1 up to the beam splitter 8.

On the other hand, the return light path from the beam splitter 8 up to the photodetector 4 is protruded with an obtuse angle relative to the forward light path from the beam splitter 8 to the objective lens 3 to conserve a larger space delimited by the forward and return light paths. Consequently, an electric motor, such as a spindle motor, having a larger driving capacity may be employed as driving means for rotationally driving the magneto-optical disc 2 for assuring stabilized rotation of the magneto-optical disc 2.

If, as shown in FIG. 7, a reflective mirror 41 is provided between the collimator lens 10 and the object lens 3, herein not shown, for reducing the thickness of the optical pickup device, the return light path from the beam splitter 8 up to the photodetector 4 does not collide with the spindle motor 42 rotationally driving the magneto-optical disc 2, so that not only the space factor may be improved but also a larger length n may be assured for the radial distance of the information signal recording region.

Also, the angle which the optical axis of the light beam L from the laser light source 1 makes with the incident surface 32 and the outgoing surface 33 of the beam splitter 8 is set to 90°, while the angle which the optical axis of the return light beam Lr makes with the incident surface 32 and the outgoing surface 33 is similarly set to 90°, so that no distortion due to aberration is produced in the beam spot of the return light beam Lr radiated on the photodetector 4. Consequently, if the focusing error signal Sf is to be produced based on changes in the spot shape of the return light beam Lr, it becomes possible to produce a correct focusing error signal Sf based on the detection output of the photodetector 4 to achieve correct focusing control of the light beam L converged on the magneto-optical disc 2.

Figure 8:
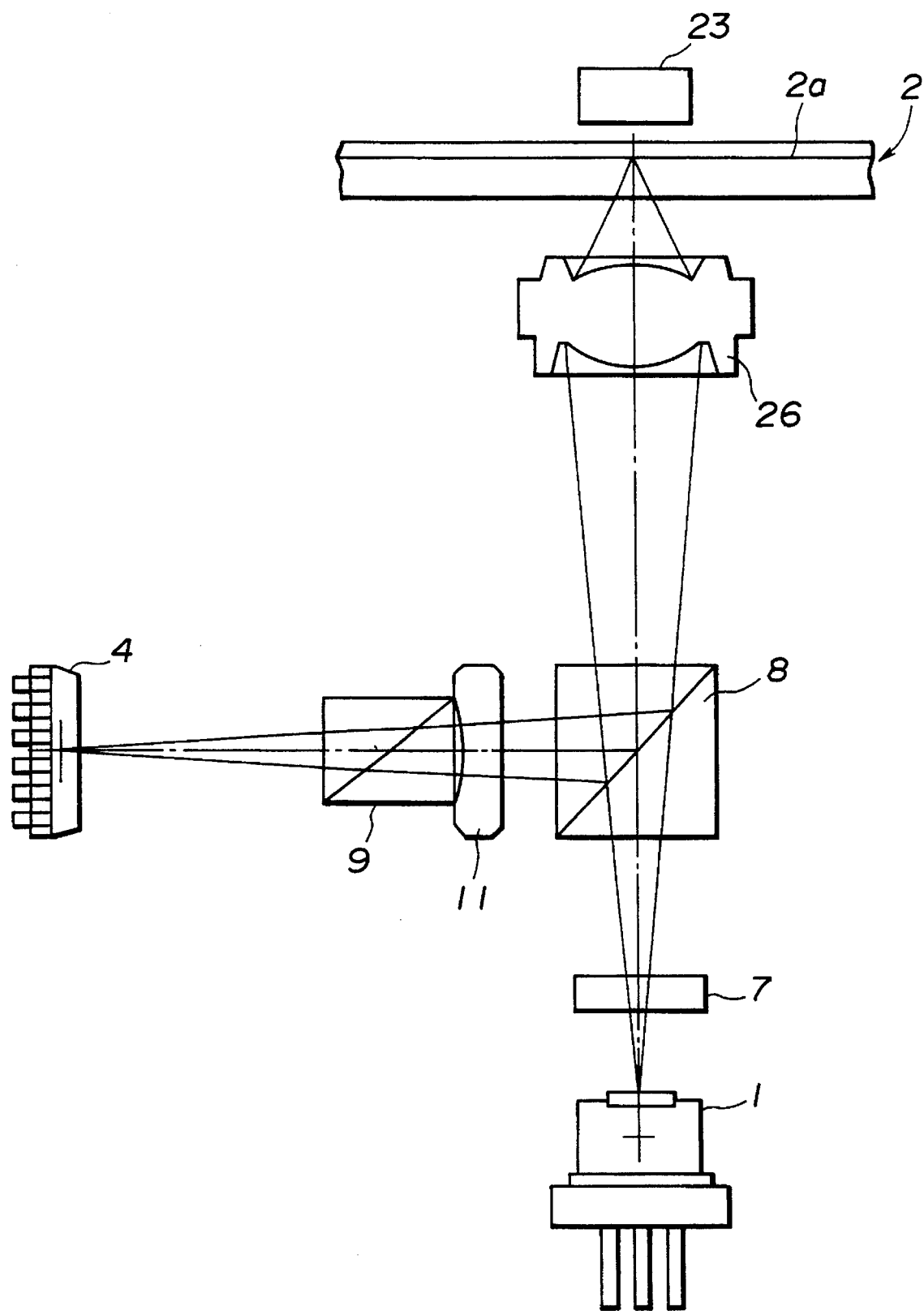
FIG. 8 is a plan view similar to FIG. 5 and showing an arrangement in which a finite-system objective lens is employed as an objective lens.

In the above-described embodiment, an infinite-system objective lens 3 is used for converging the light beam L on the signal recording surface 2a of the magneto-optical disc 2. Alternatively, a finite-system objective lens 26 as shown in FIG. 8 may be employed, in which case the collimator lens 10 may be eliminated to contribute further to reduction in size and costs of the optical pickup device.

Figure 9:
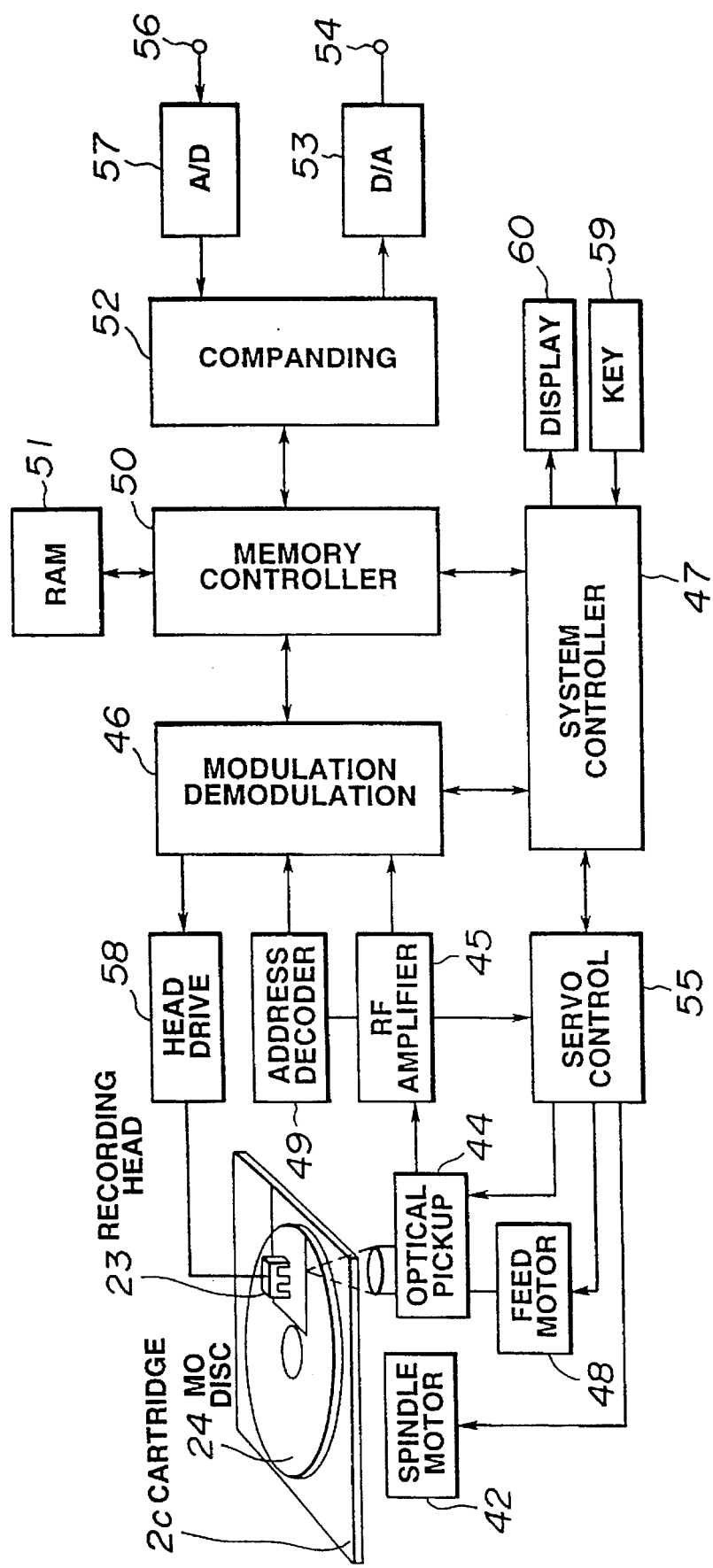
FIG. 9 is schematic block diagram showing a recording/reproducing apparatus for a magneto-optical disc employing the optical pickup device according to the present invention.

A recording/reproducing apparatus for a magneto-optical disc, in which the above-described optical pickup device is employed for recording/reproducing information signals on or from the magneto-optical disc for audio data recording/reproduction, is hereinafter explained. The arrangement of the recording/reproducing apparatus is shown in FIG. 9, in which the magneto-optical disc 2 as loaded on a cartridge 2c is loaded on the recording/reproducing apparatus so as to be driven by a spindle motor 42. The audio signals recorded by magnetic field modulation on the spirally extending track on the disc are read by an optical pickup 44 and transmitted via an RF amplifier 45 to a modulating/demodulating circuit 46 for demodulating data previously modulated for recording. The modulation for recording and demodulation at the modulating/demodulating circuit 46 is digital modulation such as that known as 8–14 modulation (EFM). The processing by the modulating/demodulating circuit 46 is executed under control by a system controller 47.

Meanwhile, address data are previously recorded by wobbling on each track formed on the magneto-optical disc 2. It is this wobbling information that is detected by an address decoder 49. That is, output playback signals of the RF amplifier 5 are supplied to the address decoder 49 where the address data recorded by wobbling are decoded and transmitted via the modulating/demodulating circuit 46 to the system controller 47.

The audio data demodulated by the modulating/demodulating circuit 46 is supplied to a memory controller 50 for storage transiently in a RAM 51 connected to the memory controller 50. The RAM 51 is a data buffer for assuring continuous audio data output even on the occasion of momentary interruption of playback data. The data stored in the RAM 51 is supplied to a companding circuit 52 for expanding the data compressed for recording. The expanded data is translated by a digital/analog converter 53 into analog audio signals which are transmitted to an audio signal output terminal 54.

The optical pickup device and a recording head 23 are driven in a direction radially of the disc by a feed motor 48 under control of a servo control circuit 47 based on commands from the system controller 47. Playback signals outputted by the RF amplifier 45 are supplied to the servo control circuit 55 for tracking servo control. Rotational driving by the spindle motor 42 is also performed under control of the servo control circuit 47.

The recording system is so designed that analog audio signals produced at an audio signal input terminal 46 are converted by analog/digital converter 57 into digital audio data which is compressed by the companding circuit 52. The compressed audio data is supplied to the memory controller 50 for storage transiently in the RAM 51 connected to the memory controller 50. The audio data read from the RAM 51 is modulated by the modulating/demodulating circuit 46 for recording. The modulated audio data is supplied to a head driving circuit 58 for driving the recording magnetic head 23.

The recording head 23 is arranged on the opposite side of the disc 1 with respect to the optical pickup device 4 directly above the point of laser radiation on the disc 1. During recording, the magnetic field generated by the recording head 23 is recorded on the disc 1 as the recording point of the disc 1 is heated by the laser beam radiated by the optical pickup device on the disc 1.

The recording and reproduction is controlled based on actuation of an actuating key 59 connected to the system control let 47. A display device 60 such as a liquid crystal display, is connected to the system controller 47 for displaying data concerning the recording and playback by numerals or alphabets.

The optical pickup device 44 in the recording/reproducing apparatus includes various optical components, such as the object lens 3, collimator lens 10, beam splitter 10, beam splitter 8, three-beam Wollaston prism 9, multiple lens 11 or the phase diffraction lattice 37, as shown in FIGS. 3 and 5 to 7. The polarization film characteristics of the multi-layer dielectric film 12 are so selected as to reflect 60 to 80% of the modulated polarized component of the light beam incident on the multi-layer dielectric film 12 and 20 to 40% of components orthogonal to the modulated polarized component of the incident light beam. Besides, the angle between the optical axis of the light beam incident on the multi-layer dielectric film 12 and the line normal to the surface of the multi-layer dielectric film is selected so as to be larger than 45°, while the incident surface to the beam splitter 12 makes a right angle with the optical axis of the incident light beam and the outgoing surface from the beam splitter 12 also makes a right angle with the optical axis of the outgoing light beam.

Consequently, an optical pickup device may be realized which is reduced in size and which has superior C/N characteristics. The recording/reproducing apparatus having the optical pickup device therein is excellent as a portable type deice since it is reduced in size and weight and capable of performing a stable recording/playback operation.

What is claimed is:

1. An optical pickup device comprising:

a light source for radiating a divergent light beam, an objective lens on which the light beam radiated by said light source is incident and which converges the incident light beam on an information signal recording medium, a beam splitter arranged on a first light path between the light source and the objective lens for guiding a reflected light beam containing a polarized light component modulated by the information signal recording medium to a second light path outside of said first light path, and photodetector means for detecting the reflected light beam guided by said beam splitter to said second light path, wherein the improvement resides in that said beam splitter has a multi-layer dielectric film formed by a plurality of dielectric films stacked together and is arranged at a portion on said first light path in which the light beam is a divergent light beam, said multi-layer dielectric film having polarization film characteristics of reflecting 60 to 80% of modulated polarized components of a light beam incident on the multi-layer dielectric film and 20 to 40% of components of said incident light beam orthogonal to said modulated polarized components.

2. The optical pickup device as claimed in claim 1, wherein the beam splitter is arranged at a portion on said first light path in which the light beam is a divergent light beam, the optical axis of said light beam incident on the multi-layer dielectric film of said beam splitter makes an angle larger than 45° with a line normal to the surface of the multi-layer dielectric film, a light incident surface of the beam splitter makes a right angle with the optical axis of said light beam and wherein a light outgoing surface of said beam splitter makes a right angle with the optical axis of the reflected light beam.

3. The optical pickup device as claimed in claim 1, wherein an optical device is arranged on the second light path between said beam splitter and the photodetector means for causing the reflected light beam to impinge on the photodetector means as a spot whose shape changes as a function of a displacement of the objective lens in a direction at right angles to a recording surface of the information recording medium.

4. The optical pickup device as claimed in claims 1 or 2, wherein a light beam splitting optical device exhibiting polarized light dependency is arranged at a portion on a second light path between the beam splitter and the photodetector means in which said reflected light beam is a converging light beam.

5. The optical pickup device as claimed in claim 1, wherein an optical device for converting the divergent light beam from the light source into a collimated light beam is arranged on a second light path between the beam splitter and the objective lens.

6. A recording/reproducing apparatus having a magneto-optical information recording medium loaded thereon, comprising:

an optical pickup for recording and reproducing information signals along a recording track formed extending substantially concentrically and spirally on said recording medium, a magnetic head arranged for facing said optical pickup with said recording medium in-between for generating a magnetic field as a recording signal from said recording medium, and a control circuit for controlling said optical head and said magnetic head as to a recording operation and for controlling said optical pickup as to a playback operation, wherein said optical pickup includes a light source for radiating a divergent light beam, an objective lens on which the light beam radiated by said light source is incident and which converges the incident light beam on an information signal recording medium, a beam splitter arranged on a first light path between the light source and the objective lens for guiding a reflected light beam containing a polarized light component modulated by the information signal recording medium to a second light path outside of said first light path, and photodetector means for detecting the reflected light beam guided by said beam splitter to said second light path, said beam splitter being arranged in a portion on said first light path in which the light beam is a divergent light beam, said multi-layer dielectric film having polarization film characteristics of reflecting 60 to 80% of the modulated polarized components of a light beam incident on the multi-layer dielectric film and 20 to 40% of components of said incident light beam orthogonal to said modulated polarized components, said optical pickup further including an optical device at a portion on a second light path between the beam splitter and the photodetector means in which said reflected light beam is a converging light beam, said optical device splitting the light beam into plural sub-beams depending on modulated polarized components of the reflected light beam, said photodetector means having first and second light receiving devices for receiving a reflected sub-beam from said beam splitter composed of said modulated polarized light components and a reflected sub-beam from said beam splitter composed of components orthogonal to said modulated polarized light components respectively, and for outputting corresponding detection signals, a sum signal or a difference signal of said detection signals being supplied as playback signals to a demodulating circuit so as to be demodulated under control of said control circuit to demodulate output information signals.

7. The optical pickup device as claimed in claim 6 wherein the beam splitter is arranged in a portion on said first light path in which the light beam is a divergent light beam, the optical axis of said light beam incident on the multi-layer dielectric film of said beam splitter makes an angle larger than 45° with a line normal to the surface of the multilayer dielectric film, a light incident surface of the beam splitter makes a right angle with the optical axis of said light beam and wherein a light outgoing surface of said beam splitter makes a right angle with the optical axis of the reflected light beam.

* * * * *